(12) United States Patent
Hall et al.

(10) Patent No.: US 6,285,569 B1
(45) Date of Patent: *Sep. 4, 2001

(54) SWITCHED MODE POWER SUPPLY CONTROLLER CIRCUIT AND METHOD THEREOF

(75) Inventors: Jefferson W. Hall; W. David Pace, both of Phoenix; Christopher Gass, Tempe, all of AZ (US)

(73) Assignee: Semiconductor Components Industries LLC, Phoenix, AZ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/507,652

(22) Filed: Feb. 22, 2000

(51) Int. Cl.[7] ............................. H02M 3/335; H02M 3/24; H02M 5/42
(52) U.S. Cl. ........................... 363/21.15; 363/49; 363/97; 323/901
(58) Field of Search ................... 363/20, 49, 50, 363/55, 56, 97, 131, 147, 21.12, 21.15, 21.17, 21.18; 323/901, 908

(56) References Cited

U.S. PATENT DOCUMENTS

| | | | |
|---|---|---|---|
| 4,890,211 | * 12/1989 | Telefus | 363/49 |
| 5,014,178 | 5/1991 | Balakrishman | 363/49 |
| 5,313,381 | 5/1994 | Balakrishman | 363/147 |
| 5,457,621 | * 10/1995 | Munday et al. | 363/56 |
| 5,559,683 | * 9/1996 | Schoenwald | 363/56 |
| 5,621,629 | * 4/1997 | Hemminger et al. | 363/97 |
| 5,666,044 | * 9/1997 | Tuozzolo | 323/901 |
| 5,838,555 | * 11/1998 | Lejeune et al. | 363/49 |
| 5,933,340 | * 8/1999 | Adamson | 363/97 |
| 5,990,581 | * 11/1999 | Ikegami | 363/49 |
| 6,034,516 | * 3/2000 | Goerke et al. | 323/901 |

* cited by examiner

Primary Examiner—Peter S. Wong
Assistant Examiner—Bao Q. Vu
(74) Attorney, Agent, or Firm—Robert D. Atkins; Michael T. Wallace

(57) ABSTRACT

A switching power supply (96) receives an AC voltage and converts it to a regulated DC voltage. The switching power supply (96) includes a Vcc limiter (16) to limit the operating voltage at the power supply terminal (10) of a integrated regulator circuit (118). The Vcc limiter (16) limits the operating voltage at the power supply terminal (10). When operating voltage at power supply terminal (10) increases, a differential pair of transistors (22, 24) supply a differential current to a current mirror configuration of transistors (26, 30) to supply voltage to a drive transistor (36) to increase current in the drive transistor (36) to a value based on n times the current in a reference transistor (26). An increase in current through the drive transistor (36) counteracts increased operating voltage at the power supply terminal (10), thereby reducing the operating voltage level back to a desired level.

14 Claims, 3 Drawing Sheets

SWITCHED MODE POWER SUPPLY CONTROLLER CIRCUIT AND METHOD THEREOF

FIELD OF THE INVENTION

The present invention relates in general to electronic circuits and, more particularly, to switching power supplies which converts an AC signal to a regulated DC signal.

BACKGROUND OF THE INVENTION

Most if not all electronic devices require a DC voltage of appropriate level for proper operation. The DC voltage is typically derived from an AC power source, e.g. by plugging a power supply into a wall socket. The AC voltage available at the wall socket is converted to a DC bulk voltage by a full-wave rectifier diode bridge. The DC bulk voltage is further converted to a regulated DC output voltage by a switching power supply.

The switching power supply uses a transformer, or an inductor depending on the configuration, as an energy transfer element. For example, a flyback-type power supply has a power switching transistor coupled to one side of the primary winding of a transformer. The power transistor turns on and off as determined by a regulator circuit to alternately store energy in the magnetic field of the transformer and transfer the stored energy to the secondary winding. The secondary winding of the transformer develops an output voltage across a shunt capacitor coupled across the secondary winding as a function of the energy transfer. The voltage across the capacitor provides the DC output voltage of the switching power supply.

The DC output voltage increases and decreases with the applied load. An increasing load decreases the DC output voltage and a decreasing load increases the DC output voltage. The DC output voltage, or a representation thereof, is fed back to the regulator circuit to allow the switching power supply to compensate for load variation. As the load increases, the DC output voltage decreases causing the regulator to leave the power transistor on for a longer period of time to store more energy in the magnetic field. The additional energy is transferred to the secondary winding during the off time of the power transistor to supply the increased load and re-establish the DC output voltage. As the load decreases, the DC output voltage increases which causes the regulator to leave the power transistor on for a shorter period of time to store less energy in the magnetic field. The reduced energy transfer to the secondary winding during the off time of the power transistor causes the power supply to adjust to the decreased load and reduces the DC output voltage back to its steady-state value.

One prior art switching power supply has an integrated regulator circuit with a combined feedback and power supply on a single input pin. The integrated regulator circuit has separation circuitry inside the chip to split the feedback and power supply signals. The combination of feedback and power supply signals on a single pin allows the integrated regulator to be implemented with fewer pins. In many applications however, there is a sufficient number of available pins that it is not necessary to combine feedback and power supply on a single pin. The design of the integrated regulated circuit is simplified where feedback and power supply are brought in on separate pins. In applications where feedback and power supply are brought in on a single pin the separation circuitry adds unnecessary complexity in the integrated circuit without a corresponding need or benefit.

Thus, a need exists for an integrated regulator circuit which uses completely separate operating voltage and feedback input pins to eliminate the need for complex separation circuitry. The circuit must also limit operating voltage extremes so low voltage circuitry can be used within the integrated regulator circuit.

DETAILED DESCRIPTION OF THE PRIOR ART

Figure 1:
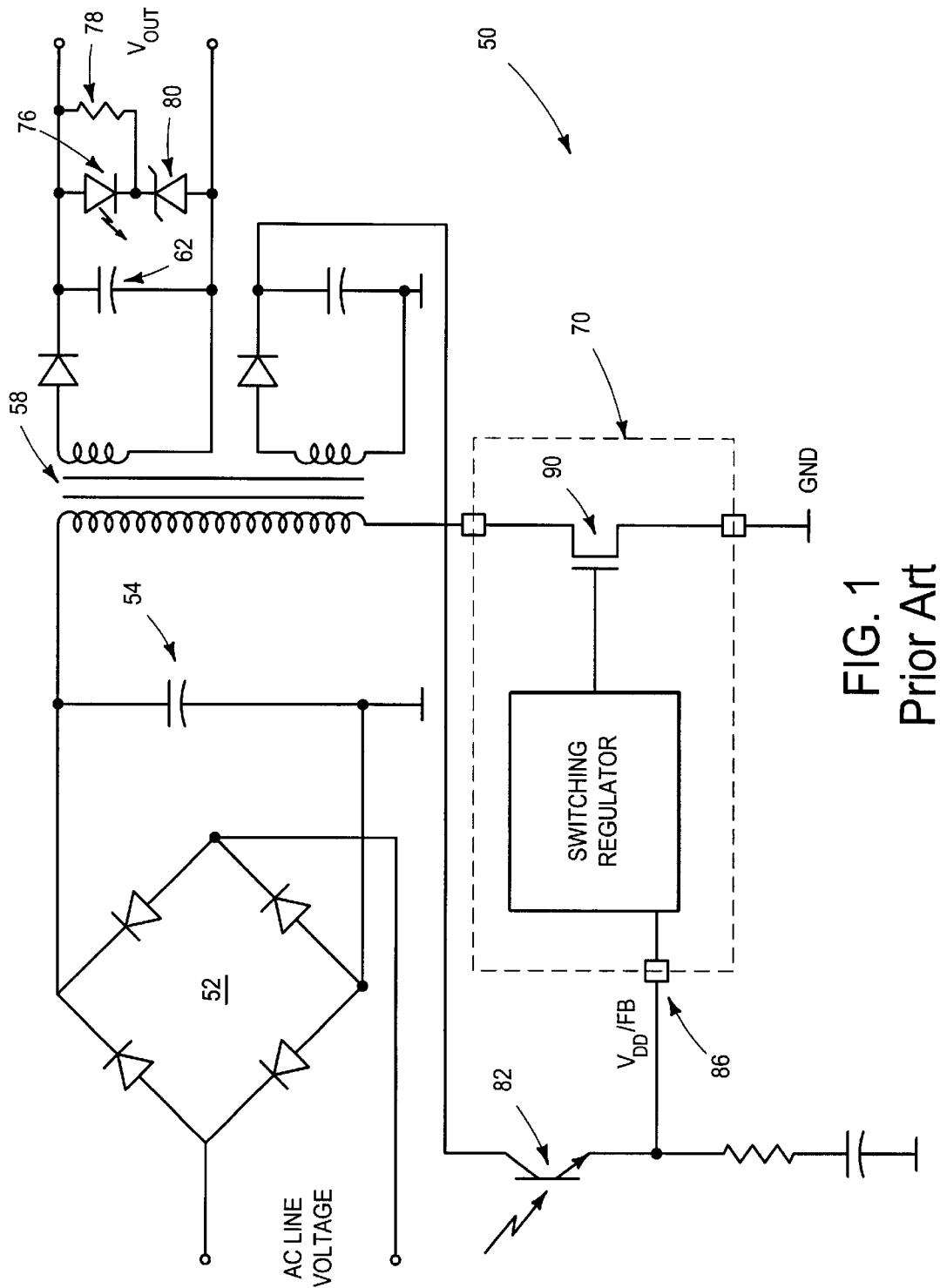
FIG. 1 is a schematic diagram of a prior art power supply.

FIG. 1 illustrates a prior art switching power supply 50 that receives an AC line voltage and converts it to a regulated DC operating voltage. Specifically, an AC line voltage is converted to a DC bulk voltage by the full-wave rectifier diode bridge 52. Capacitor 54 filters the DC bulk voltage, and the primary winding of transformer 58 receives the DC bulk voltage. Power transistor 90 conducts an inductor current through the primary winding of transformer 58 to control the amount of energy stored in the magnetic field of the transformer. When power transistor 90 conducts in a flyback mode configuration, an inductor current flows through the primary winding and stores energy in the magnetic field of transformer 58. When power transistor 90 is non-conductive, the energy stored in the magnetic field is transferred to the secondary winding where capacitor 62 is coupled across the secondary winding to develop a DC output voltage $V_{OUT}$.

A current flows through resistor 78 and zener diode 80 under nominal operating conditions. Diode 76 and photo-detection transistor 82 act together to optically couple feedback information from capacitor 62 to the combined feedback and power supply terminal 86 of regulator circuit 70. The DC output voltage ($V_{OUT}$) typically operates either slightly above or below a predetermined regulation threshold in response to output loading. When the output load is relatively large causing $V_{OUT}$ to be below the regulation threshold, then the voltage across resistor 78 is such that photo diode 76 is less strongly forward biased resulting in transistor 82 being less conductive and the feedback signal less asserted. An increase in $V_{OUT}$ above the regulation threshold causes photo diode 76 to become more strongly forward biased resulting in transistor 82 being more conductive and the feedback signal more asserted.

Feedback information resulting from DC output voltage variations is optically fed back by diode 76 to transistor 82 and combined with power supply on power supply terminal 86 of regulator circuit 70. Thus, a combined feedback and power supply signal is applied to power supply terminal 86. Regulator circuit 70 uses internal separation circuitry to separate power supply which supplies power to the integrated circuit, from the feedback information which controls pulse width modulation to generate a gate drive signal for power transistor 90. Power transistor 90 controls the amount of energy transferred through transformer 58, turning it on and off in a duty cycle necessary to regulate $V_{OUT}$.

DETAILED DESCRIPTION OF THE PREFERRED EMBODIMENT

Figure 2:
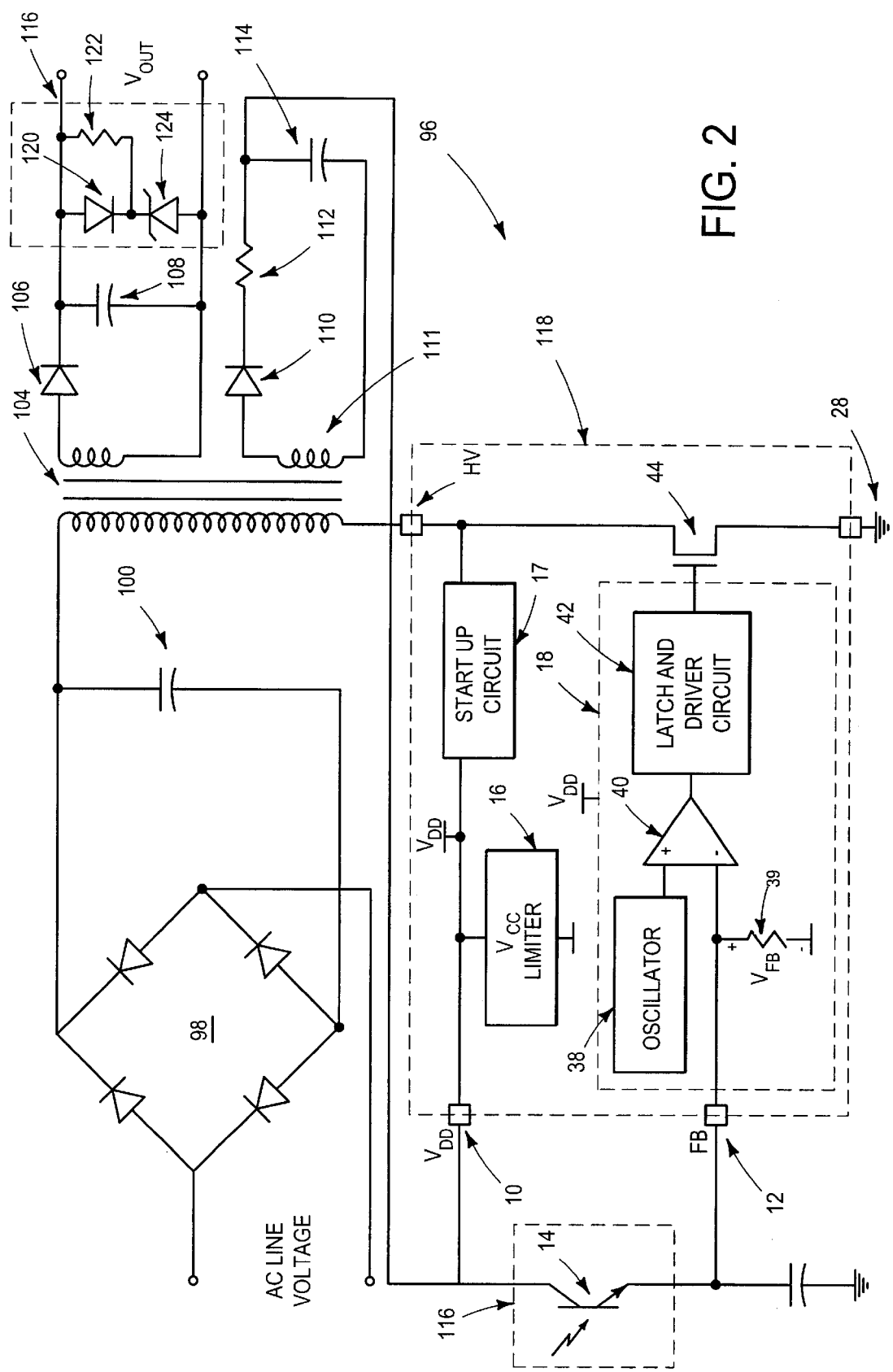
FIG. 2 is a schematic diagram of a switching power supply including a Vcc limiter.

FIG. 2 illustrates a preferred embodiment of switching power supply 96. Specifically, switching power supply 96 receives an AC line voltage and converts it to a regulated DC operating voltage. An AC line voltage is converted to a DC bulk voltage by full-wave rectifier diode bridge 98. Capacitor 100 filters the DC bulk voltage, and the primary winding of transformer 104 receives the DC bulk voltage. Power transistor 44 conducts an inductor current through the primary winding of transformer 104 to control the amount of energy stored in the magnetic field of the transformer, and operates on regulation cycles controlled by switching regulator circuit 18. When power transistor 44 conducts in a flyback mode configuration, an inductor current flows through the primary winding and stores energy in the magnetic field of transformer 104. When power transistor 44 is non-conductive, the energy stored in the magnetic field is transferred to the secondary winding where capacitor 108 is coupled across the secondary winding to develop DC output voltage ($V_{OUT}$). Diode 106 prevents current flow back into the secondary winding.

In response to $V_{OUT}$ variations, feedback information is coupled and fed back to regulator circuit 118 by feedback circuit 116. The information is optically fed back by optical light-emitting diode (LED) 120 to the base of transistor 14, and received on feedback terminal 12 of regulator circuit 118. Feedback terminal 12 is connected to the emitter of transistor 14. Feedback information received controls pulse width modulation in switching regulator 18 to generate a gate drive signal for power transistor 44. Power transistor 44 controls the amount of energy stored in the magnetic field of transformer 104 to turn it on and off in a duty cycle necessary to regulate $V_{OUT}$. A practical implementation of power transistor 44 is a high voltage JFET in series with a low voltage MOSFET. The gate of the low voltage MOSFET receives a drive signal, and the drain of the high voltage JFET is connected to transformer 104.

Power supply is received at power supply terminal 10 from auxiliary winding 111. Diode 110, resistor 112, and capacitor 114 are connected to auxiliary winding 111. Power supply terminal 10 is connected to the collector of transistor 14.

A current flows through resistor 122 and zener diode 124 under normal operating conditions. LED 120 and photo-detection transistor 14 operate to feed back information from capacitor 108, in response to $V_{OUT}$ variations, to feedback terminal 12 of regulator circuit 118. If LED 120 is forward biased, then a current flowing through LED 120 generates a quantity of photons proportional to the current flow. The photons are received by the photo-detection base of transistor 14 to render it conductive. Transistor 14 attempts to conduct current from its collector to its emitter. If LED 120 is not forward biased, then no photons are emitted from LED 120 leaving transistor 14 non-conductive.

Feedback circuit 116 is typically comprised of an LED 120 having an anode and cathode, resistor 122 having two terminals, diode 124 having an anode and cathode, and photo-detection transistor 14 having two conduction terminals and one control terminal. The anode of LED 120 is coupled to the first terminal of capacitor 108, and the cathode of LED 120 is coupled to the cathode of diode 124, and the anode of diode 124 is coupled for receiving ground potential. The first terminal of resistor 122 is coupled to the anode of LED 120 and the second terminal is coupled to the cathode of LED 120. The drain of transistor 14 is connected to power supply terminal 10 of regulator circuit 118. The source of transistor 14 is connected to feedback terminal 12 of regulator circuit 118, and a control terminal of transistor 14 is coupled to receive feedback information from LED 120. Power supply terminal 10 represents an external pin that receives a power supply. Feedback terminal 12 is an external pin that receives feedback information.

Regulator circuit 118 is comprised of the following. A power supply terminal 10 of regulator circuit 118 is coupled to Vcc limiter 16 for regulating operating voltage at power supply terminal 10. Start-up circuitry is coupled to power supply terminal 10 to start-up the circuit during start or restart conditions. Start-up circuit 17 can be implemented as in U.S. Pat. No. 5,477,175 which is herein incorporated by reference. High voltage terminal (HV) is connected to the drain of power transistor 44 for coupling to high voltage on the primary winding of transformer 104. The HV terminal is an external pin of regulator circuit 118. Switching regulator circuit 18 is coupled to receive a feedback signal from feedback terminal 12 of regulator circuit 118 to provide a drive signal to power transistor 44. Switching regulator circuit 18 comprises oscillator 38, comparator 40, resistor 39, and latch and driver circuit 42. Oscillator 38 generates an output signal. Comparator 40 couples to receive oscillator 38's output signal, and couples to receive the feedback signal on feedback terminal 12. Latch and driver circuit 42 couples to receive an output from comparator 40, and provides a drive signal as an output to power transistor 44. Power transistor 44 has a drain coupled to HV of regulator circuit 118, a source coupled to ground potential 28, and a gate coupled to receive the output drive signal from switching regulator circuit 18. Resistor 39 has one terminal coupled to receive the feedback signal on feedback terminal 12, and a second coupled to ground potential 28. Regulator circuit 118 is typically implemented as an integrated circuit using conventional high voltage integrated circuit manufacturing processes.

DC output voltage $V_{OUT}$ typically operates around a predetermined regulation threshold in response to output loading. The regulation threshold is set by the voltage across zener diode 124 plus the voltage across LED 120 when forward biased. When the output load is relatively large causing $V_{OUT}$ to be below the regulation threshold, then the voltage across resistor 122 is such that LED 120 is less strongly forward biased causing transistor 14 to be more non-conductive (feedback less asserted). An increase in $V_{OUT}$ above the regulation threshold causes LED 120 to become more forward biased. A current flows through LED 120 and generates a quantity of photons proportional to the current flow. The photons transferred to the base of transistor 14 are sufficient to render it more conductive (feedback more asserted) causing a resulting change in current flow through transistor 14. A change in current flow through transistor 14 creates a voltage drop across resistor 39 denoted by $V_{FB}$. Voltage $V_{FB}$ is present at a first terminal of comparator 40 with a signal from oscillator 38 at a second terminal of comparator 40. These two signals are applied to inputs of comparator 40, to provide an output to control the on-time of power transistor 44. A change in duty cycle for comparator 40 provides a change in on-time of power transistor 44 resulting in a change of energy transfer to the secondary winding to provide the necessary change in $V_{OUT}$ for regulation. When $V_{OUT}$ is greater than the regulation threshold and the feedback signal is present, then the feedback loop provides a higher voltage to feedback terminal 12 causing switching regulator circuit 18 to reduce the gate drive signal and duty cycle to power transistor 44. Thus, $V_{OUT}$ is held at the regulation threshold. Reducing the gate drive signal and duty cycle decreases the average amount of time that power transistor 44 is conducting. Consequently, holding power transistor 44 off for a greater period of time stores less additional energy in the magnetic field of transformer 104. As a result, less additional energy is transferred to the secondary winding and $V_{OUT}$ decreases accordingly.

Thus, switching regulator circuit 18 provides a gate drive signal to the gate of power transistor 44 in response to the feedback signal to turn it on and off as necessary to regulate $V_{OUT}$.

Figure 3:
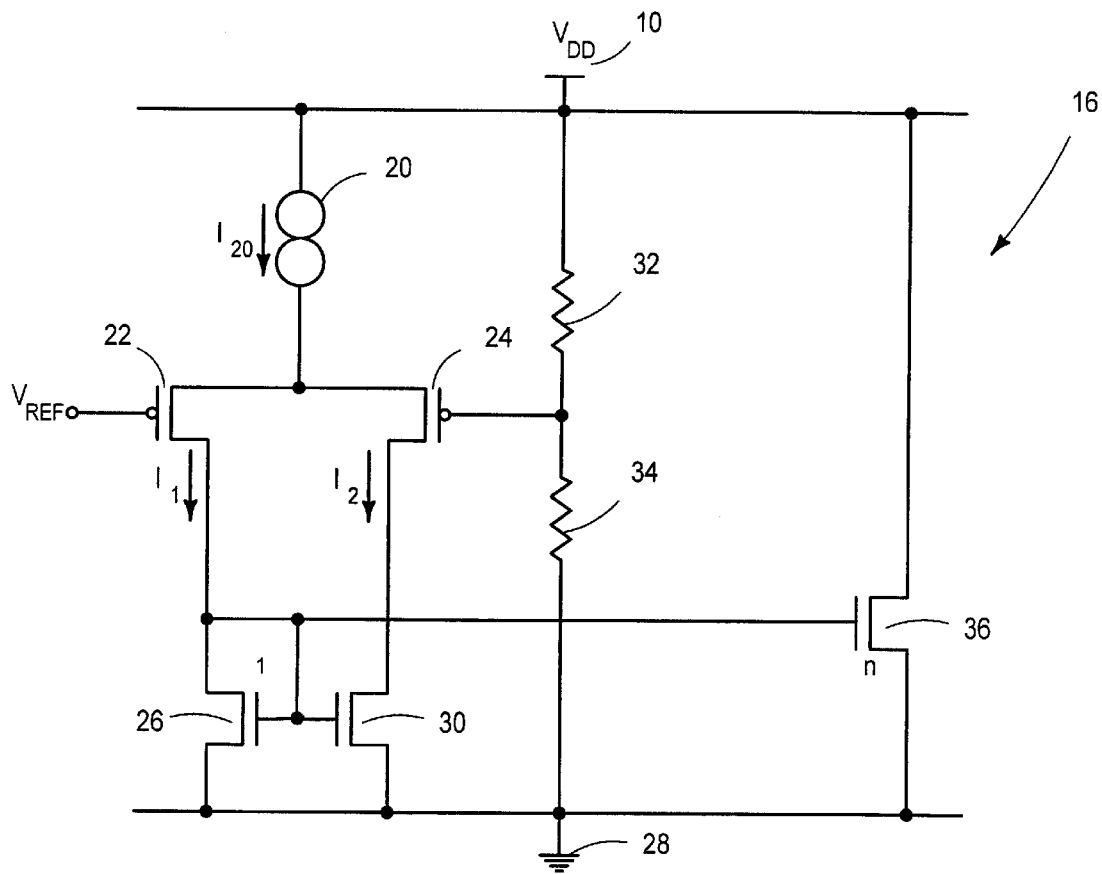
FIG. 3 is a schematic diagram of a Vcc limiter included in FIG. 2.

FIG. 3 illustrates Vcc limiter 16 which limits the operating voltage supply at power supply terminal 10. A feedback signal is received at feedback terminal 12, and a separate operating voltage supply is received at power supply terminal 10 of regulator circuit 118. The operating voltage supply is delivered to the integrated circuit from an auxiliary winding which may undergo voltage variations. Thus, power supply terminal 10 requires voltage limiting.

Vcc limiter 16 has current source 20 providing a constant current I20 with a typical value of 10 uA, to a differential pair of transistors 22 and 24. Transistor 22 is a p-type MOSFET transistor having a drain coupled to receive a fraction of the constant current I20, a source providing a differential current I1, and a gate that receives a reference voltage. The reference voltage (Vref) typically operates at 1.25 volts. Transistor 24 is a p-type MOSFET transistor having a drain coupled to receive the remaining fraction of constant current I20, a source providing a differential current I2, and a gate that receives a voltage level divided down by the resistor network containing resistors 32 and 34 and the operating voltage from power supply terminal 10. Resistor 32 has a terminal coupled to power supply terminal 10, and a terminal coupled to the gate of transistor 24. Resistor 34 has a terminal coupled to the gate of transistor 24, and a terminal coupled to power supply terminal 28. The transistor pair 26 and 30 constitute a current mirror configuration. Transistor 26 is setup to operate in a diode configuration with a drain coupled to receive differential current I1 from transistor 22, a source coupled to power supply terminal 28, and a gate connected to the drain. Transistor 30 has a drain coupled to receive the differential current I2 from transistor 24, a source coupled to power supply terminal 28, and a gate connected to the gate of transistor 26. The current mirror configuration supplies a voltage to transistor 36 to generate a current in order to maintain and reduce variations in the operating voltage at power supply terminal 10. Transistor 36 has a drain coupled to receive the operating voltage at power supply terminal 10, a source coupled to power supply terminal 28, and a gate connected to the gate of transistor 26.

In typical operation, when the operating voltage at power supply terminal 10 increases above a specified level, the voltage at the gate of transistor 24 also increases in proportion to a level based on the voltage divider network made up of resistor 32 and resistor 34. The current mirror configuration supplies a voltage to the gate of transistor 36 which increases conduction current in transistor 36 to a value based on n times the current in transistor 26. A typical value for n is 500. The increase in conduction current through transistor 36 counteracts the increased operating voltage at power supply terminal 10, thereby reducing the operating voltage level back down to a desired level. If the operating voltage at power supply terminal 10 decreases below the specified level, the voltage at the gate of transistor 24 also decreases in proportion to a level based on the voltage divider network made up of resistor 32 and resistor 34. The current mirror configuration supplies a voltage to the gate of transistor 36 to decrease the conduction current in transistor 36 a multiple of n times the current in transistor 26. The decrease in conduction current through transistor 36 counteracts the decreased operating voltage at power supply terminal 10 thus increasing the operating voltage level back to the desired level.

In summary, the present invention demonstrates switching power supply 96 use in power supply applications. Switching regulator circuit 18 receives a feedback signal from feedback circuit 116 in response to $V_{OUT}$ variations. The feedback signal is received at feedback terminal 12 of integrated regulator circuit 118, and supplies a gate drive signal to power transistor 44. Power transistor 44 conducts an inductor current through the primary winding of transformer 104 in response to the gate drive signal to reduce the $V_{OUT}$ variations of switching power supply 96.

Vcc limiter 16 receives an operating voltage at power supply terminal 10 of integrated regulator circuit 118. The operating voltage typically will have undesired voltage variations from the power supply and require voltage limiting. Vcc limiter 16 as used, provides a stable operating voltage while allowing an integrated regulator circuit to have separate pins for feedback and operating voltage. In contrast to the prior art, the embodiment requires less additional circuitry inside the integrated regulator circuit to separate the feedback and voltage signals. Additionally, having separate feedback and operating pins allows an external resistor to be used in parallel with resistor 39 to program the feedback.

Thus, the embodiment decreases regulator circuit complexity, provides a more cost effective solution by reducing die size, and provides the option of using optocoupler and auxiliary winding configurations if desired.

What is claimed is:

1. A regulator circuit, comprising:
    a first power supply terminal of the regulator circuit for receiving an operating voltage;
    a feedback terminal of the regulator circuit;
    a first transistor having a first conduction terminal coupled to the first power supply terminal, a second conduction terminal coupled to the feedback terminal, and a control terminal coupled for receiving a feedback signal;
    a Vcc limiter coupled to the first power supply terminal for regulating the operating voltage, the Vcc limiter including,
    (a) a transistor pair having a first control terminal coupled to receive a reference signal and a second control terminal coupled to receive a signal indicative of the operating voltage and coupled to provide a control signal; and
    (b) a current mirror having a first conduction terminal coupled to receive the control signal and a second conduction terminal coupled to the first power supply terminal; and
    a switching regulator circuit coupled to the feedback terminal for providing a regulator output signal.

2. The regulator circuit of claim 1, wherein the Vcc limiter further includes:
    a first resistor having a first terminal coupled to the first power supply terminal and a second terminal coupled to the second control terminal of the transistor pair; and
    a second resistor having a first terminal coupled to the second control terminal of the transistor pair and a second terminal coupled to the second power supply terminal.

3. The regulator circuit of claim 1, wherein the switching regulator circuit further includes:
    an oscillator;
    a comparator having a first terminal coupled to receive an oscillator signal, a second terminal coupled to the feedback terminal; and
    a latch and driver circuit having an input coupled to an output of the comparator, and an output providing a drive signal.

4. The regulator circuit of claim 3, further including a transistor having a first conduction terminal coupled to a high voltage terminal, a second conduction terminal coupled to the second power supply terminal, and a control terminal coupled for receiving the drive signal.

5. A regulator circuit for regulating a power supply, comprising:

a switching regulator circuit coupled to a feedback terminal at a first pin of the regulator circuit for receiving a feedback signal which controls the switching regulator circuit to provide a regulator output signal; and a Vcc limiter coupled to a first power supply terminal at a second pin of the regulator circuit for receiving an operating voltage, wherein the Vcc limiter regulates the operating voltage at the first power supply terminal and at a portion of the switching regulator circuit, the Vcc limiter including, (a) a transistor pair having a first control terminal coupled to receive a reference signal and a second control terminal coupled to receive a signal indicative of the operating voltage and coupled to provide a control signal; and (b) a current mirror having a first conduction terminal coupled to receive the control signal and a second conduction terminal coupled to the first power supply terminal.

6. The regulator circuit of claim 5, further including a first transistor having a first conduction terminal coupled to the first power supply terminal at a third pin of the regulator circuit for receiving an inductor current;

a second conduction terminal coupled to a second power supply terminal at a fourth pin of the regulator circuit; and a control terminal coupled for receiving the regulator output signal.

7. The regulator circuit of claim 6, wherein the Vcc limiter, the switching regulator, and the first transistor are in an integrated circuit.

8. The regulator circuit of claim 5, further including: a second transistor having a first conduction terminal coupled to the first power supply terminal at the second pin of the regulator circuit, a second conduction terminal coupled to the feedback terminal of the first pin of the regulator circuit, and a control terminal coupled for receiving the feedback signal.

9. The regulator circuit of claim 8, wherein the Vcc limiter further includes:

a first resistor having a first terminal coupled to the first power supply terminal, and a second terminal coupled to the second control terminal of the transistor pair; and a second resistor having a first terminal coupled to the second control terminal of the transistor pair and a second terminal coupled to the second power supply terminal.

10. A method of regulating a power supply for an integrated circuit, comprising:

receiving a feedback signal at a feedback terminal of the integrated circuit;

controlling the integrated circuit with the feedback signal to provide a regulator output signal;

receiving an operating voltage at a first power supply terminal of the integrated circuit;

decreasing the operating voltage if the operating voltage is detected as increasing; and increasing the operating voltage if the operating voltage is detected as decreasing.

11. The method of claim 10, further including the step of applying the feedback signal to a control terminal of a transistor.

12. The method of claim 11, further including the step of coupling a collector of the transistor to the first power supply terminal and an emitter of the transistor to the feedback terminal of the integrated circuit.

13. The method of claim 10, wherein the feedback terminal of the integrated circuit is a first pin and the first power supply terminal is a second pin of the integrated circuit.

14. The method of claim 13, further including the step of providing a voltage regulation at the second pin of the integrated circuit with a Vcc limiter coupled to the second pin.

* * * * *